United States Patent [19]

Lange

[11] 3,866,183

[45] Feb. 11, 1975

[54] COMMUNICATIONS CONTROL APPARATUS FOR THE USE WITH A CACHE STORE

[75] Inventor: Ronald E. Lange, Phoenix, Ariz.

[73] Assignee: Honeywell Information Systems Inc., Waltham, Mass.

[22] Filed: Aug. 31, 1973

[21] Appl. No.: 393,358

[52] U.S. Cl. .......... 340/172.5

[51] Int. Cl. .......... G06f 13/00

[58] Field of Search .......... 340/172.5

[56] References Cited

UNITED STATES PATENTS

| | | | |
|---|---|---|---|
| 3,339,183 | 8/1967 | Bock | 340/172.5 |
| 3,537,072 | 10/1970 | Macon | 340/172.5 |
| 3,569,938 | 3/1971 | Eden | 340/172.5 |
| 3,675,217 | 7/1972 | Dauber | 340/172.5 |
| 3,685,020 | 8/1972 | Meade | 340/172.5 |
| 3,693,165 | 9/1972 | Reiley | 340/172.5 |
| 3,701,977 | 10/1972 | Mendelson | 340/172.5 |
| 3,705,388 | 12/1972 | Nishimoto | 340/172.5 |
| 3,723,976 | 3/1973 | Alvarez | 340/172.5 |
| 3,740,723 | 6/1973 | Beausoleil | 340/172.5 |
| 3,761,881 | 9/1973 | Anderson | 340/172.5 |

*Primary Examiner*—Gareth D. Shaw
*Assistant Examiner*—James D. Thomas
*Attorney, Agent, or Firm*—Edward W. Hughes

[57] ABSTRACT

A communications control apparatus prepares for the generation of an interrupt signal along with appropriate address signals to retrieve data information from the main memory store upon the request from the central processor. During preparation time, a tag directory is searched for an indication that the data information required is presently in the cache store. If a comparison is made, a match signal is generated to prevent the generation of the interrupt signal. The communications control apparatus addresses the cache store to retrieve the data information for use by the processor.

7 Claims, 5 Drawing Figures

COMMUNICATIONS CONTROL APPARATUS FOR THE USE WITH A CACHE STORE

BACKGROUND OF THE INVENTION

The present invention relates generally to data processing systems and more particularly to the control of communications between a main memory store and a processor having an associative memory.

FIELD OF THE INVENTION

With large computer systems, having memories on the order of a million words or greater, it becomes very expensive to increase system performance by reducing the memory access time. An alternative to decreasing data access time to instructions and operands is to use a high-speed cache memory store which is interposed between the main memory store and the central processor.

When data is to be fetched from the main memory store in accordance with an absolute address supplied by the central processor, it is necessary to make an association between the absolute address and the actual address internal to the cache memory subsystem. In retrieving data information from the main memory store, the processor must select and develop the address containing the data information and then select a port to access the main memory store. Then to make effective use of the cache memory store, the cache store must be checked first before the processor accesses the main memory store.

DESCRIPTION OF THE PRIOR ART

In prior art data processing systems, elaborate apparatus was used to store the addresses of the data information carried in associative stores. The addressing mechanism of the associative store was checked first to determine whether the data information is in the associative store. If not, then the processor actuates the communications control to connect with the main memory store to retrieve the required data information.

It is a primary object of this invention to anticipate the possibility that the data information is not in the cache store and therefore effectively conceal the origination of the data information supplied to the processor.

SUMMARY OF THE INVENTION

The communications control apparatus of the present invention for use with a data processor in the retrieval of data information from either a main memory store or a cache store gates the data information address signals into the control apparatus for activation of a port select means and a function means to determine the operation required. The port select means actuates an interrupt generator on a communication connection requirement. A portion of the address signal searches a tag directory of a cache store for the data information address. A comparator means compares another portion of the address signal with the information stored in the tag directory and if the data information is found in the cache store, the comparator generates a signal which inhibits the generation of an interrupt signal by the interrupt generator.

The communications control apparatus takes the address generated by the central processor, manipulates the address signals to construct the actual address location of the data information, actuates the cache store tag directory to search for the data information in cache store, selects the communications line with the main memory store, actuates the generation of the interrupt signal which accomplishes the interconnection with the main memory store, inhibits the generation of the interrupt signal if the data information is present in the cache store, actuates the cache store if the data information is stored therein, and supplies the data information to the processor whether from the main memory store or the cache store without requiring extra time to check the cache store for the data information. In order to take full advantage of the speed of the cache store, the cache store must be searched for the data information since if the data information is stored in the cache store the data information can be supplied to the processor in a fraction of the time required to retrieve the information from the main memory store.

It is, therefore, an object of the present invention to provide an enhanced communications control apparatus for a data processing system having a cache store.

It is a more particular object of the present invention to provide improved communications control apparatus for a data processing system which permits the searching for the required data information from a cache store of the central processor while preparing for the retrieval of the data information from the main memory store.

It is another object to provide a communications control apparatus that controls the checking of a processor cache store for data information while at the same time prepares apparatus for retrieval of the data information from the main memory store and which inhibits the communication with the main memory store if the data information is stored in the cache store.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

DESCRIPTION OF THE PREFERRED EMBODIMENT

Referring to the figures, a cache store 10 is a "look-aside memory" or high speed buffer storage preferably located in the Central Processor of a data processing system. The cache store provides a fast access to blocks of data previously retrieved from the main memory store. The effective access time in the cache store according to the present invention is obtained by operating the cache store in parallel to existing processor functions. Successful usage of the cache store requires that a high ratio of storage fetches for data information be made from the cache store rather than requiring that the processor address the main memory store directly. In any event, the search of the cache store for the possible quick retrieval of the data information should not delay the retrieval from the main memory store. A communications control system according to the present invention checks the cache store while the generation of a potential retrieval from main memory store is being processed. If the data information is found in the cache store, the retrieval is blocked. The processor obtains the data information from the cache store in a much shorter period of time without the processor being aware of the source.

Figure 1:
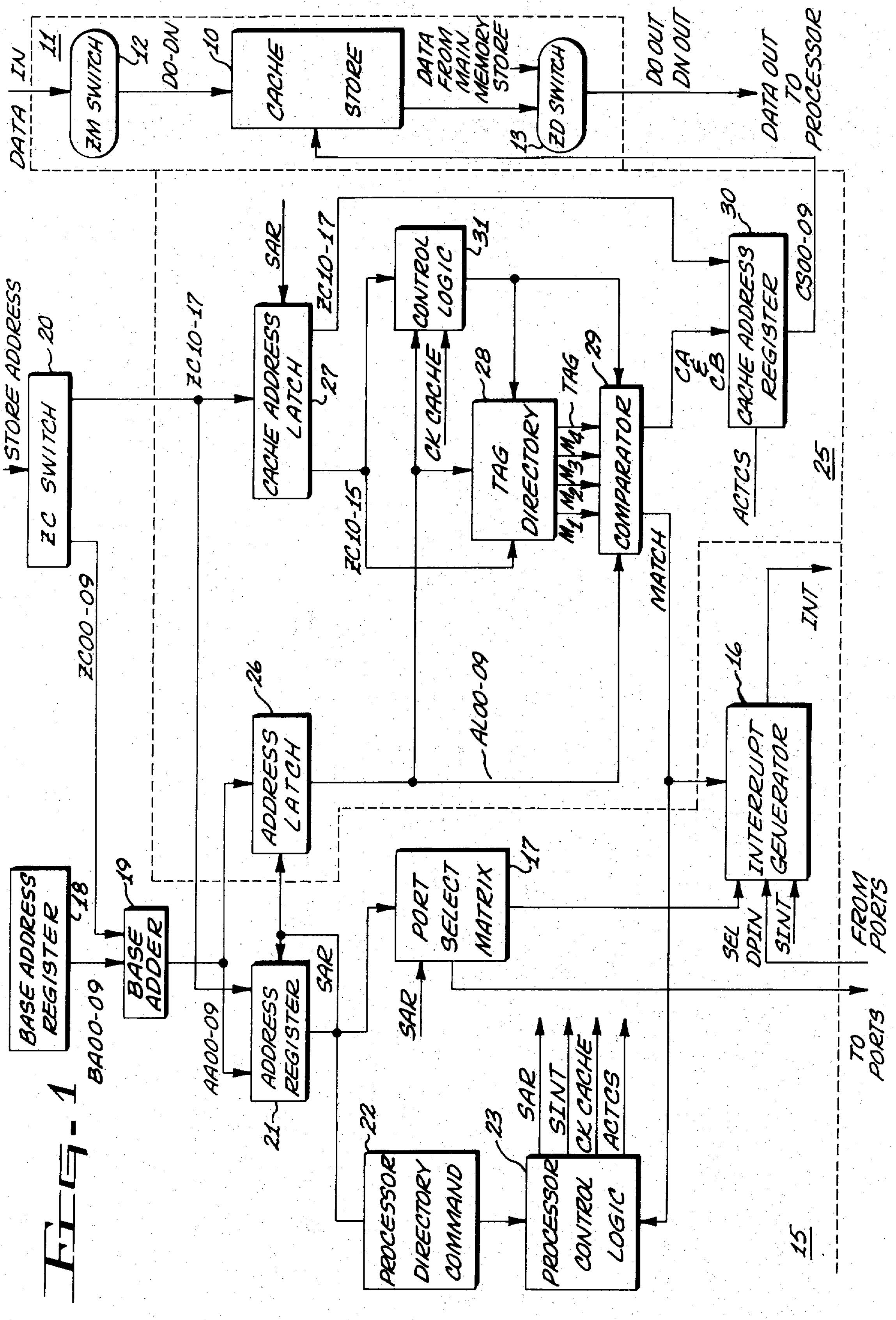
FIG. 1 is a block diagram of a preferred embodiment of a communications control apparatus together with a central processor cache store.

The communication control system of FIG. 1 can be divided into three main areas. The first area is a cache store section 11 which includes the cache store 10, an input memory bus, a ZM switch 12, and a read allow circuit or output memory bus, and a ZD switch 13. The second area or section is a data processor control section 15 which includes an interrupt generator circuit 16, a port select matrix circuit 17, a base address register 18, a base adder 19, a ZC switch 20 for controlling the store address input, an address register 21, and a processor directory command 22 and a processor control logic 23 blocks signifying the control logic of the processor. The third area is a cache directory section 25 which includes an address latch register 26, a cache address latch register 27, a tag directory 28, a comparator 29, a cache address register 30, and associated counters and control logic shown as block 31.

During main memory store fetch cycles, the data information is distributed from the input memory bus for usage by the processor while at the same time the ZM switch 12 is enabled to allow storage into the cache store 10. On subsequent processor cycles, the cache store 10 is checked at the same time that a fetch from the main memory store (not shown) is being readied. If the data needed is already in the cache store, the fetch from the main memory store is aborted by controlling the communications control section. A cache read cycle is enabled by the processor directory command section 22, the ZM switch 12 is disabled and the ZD switch 13 is enabled to transfer the data information from the cache store 10 directly to the processor.

Figure 3:
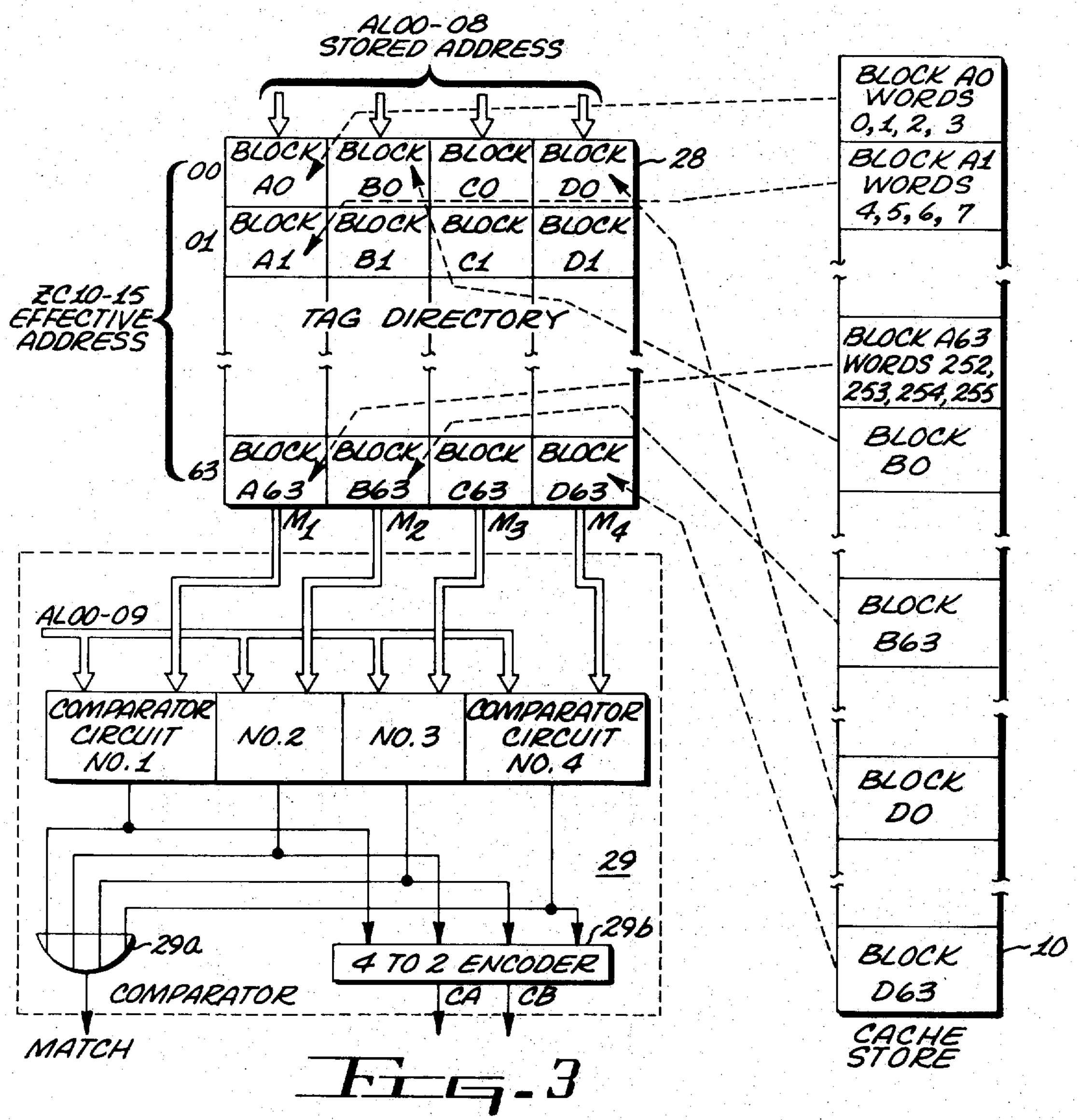
FIG. 3 shows the mapping strategy between the cache store and the tag directory shown in FIG. 1.

The cache or tag directory 28 identifies the storage section or block in the cache store 10. "TAG" words in stored in the tag directory 28 to reflect the absolute address of each data block. The mapping of the tag directory 28 is called a four level set associative mapping. The mapping organization is shown in FIG. 3. The tag directory is divided into N columns, 64 for example, to correspond to the number of blocks in the cache store. Each column has 4 levels. The cache store is divided into "N" number of sections of 64 four-word blocks (256 words). Each block maps directly into a corresponding column of the directory. Each column of the tag directory then can contain addresses of four blocks, each from a different section. The replacement procedure for loading new blocks into a column which is full is on a first in, first out basis and is called round robin organization (RRO).

The tag directory 28 is implemented as a small memory with the number of locations equal to the number of blocks in the cache store. Address bits ZC10–15 of the effective address are used to access one of the locations, see FIGS. 1 and 2. Each of the locations or columns includes 4 address tag words. Each tag word includes the address signals AL00–09 of the absolute address. Since signals ZC10–15 of the effective address are available sooner, they are used for tag directory access.

Referring again to FIG. 1 and to the timing chart of FIG. 6, during the time that tag directory access is being accomplished, the addition of base address bits BA00–09 from the base address register 18 to the effective address bits ZC00–09 from the ZC switch 20 is taking place in the base address adder 19. The absolute address bits AA00–09 from the base address adder 19 are stored in the address register 21 and the address latch register 26 and will be available for a comparison in the comparator 29 at the same time a tag word M1–M4 is available from the tag directory 28. The comparator 29 will generate a MATCH signal between the time the strobe address register signal SAR is generated and the time that an interrupt signal INT is to be generated by the interrupt generator 16. If a comparison is made, the MATCH signal will not allow an INT signal to be generated. The comparison match indicated that a retrieval of data information from the main memory store is not required because the data information is presently available in the cache store 10. The MATCH signal enables the processor control logic 23 to generate an activate cache store ACTCS signal which is directed to the cache address register 30. The cache address register 30 addresses the location in the cache store 10 determined by the address bits ZC10–17 and the address signals CA and CB generated by the comparator 29 as a result of the comparison of the absolute address signals and the tag signals. The ZD switch 13 is activated to allow the data information from the addressed storage location in the cache store 10 to be directed to the processor. If a noncomparison is indicated by the comparator 29, no MATCH signal is generated and the interrupt generator 16 generates an INT signal which will be transmitted to the system controller via the selected port to accomplish the transfer of data information from the main memory store according to the address signals applied to the ZC switch 20. The data information from the main memory store is then retrieved and directed simultaneously to the processor and to the cache store 10. If the cache store 10 is already full, according to the first in-first out organization, the first data block placed into cache store and not subsequently used, is displaced by the new information.

Figure 2:
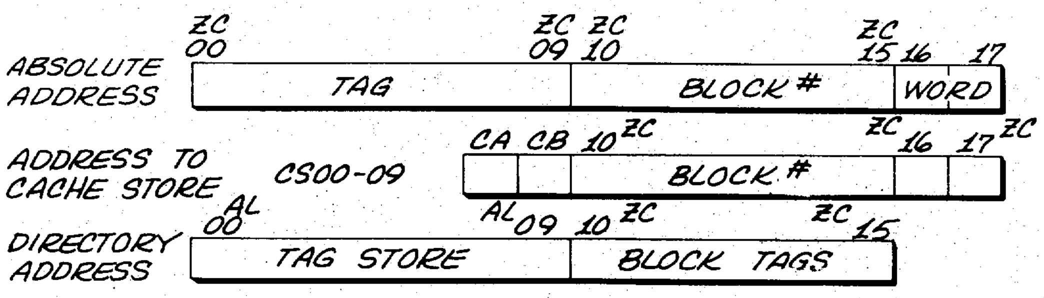
FIG. 2 is a diagram illustrating the addressing scheme used by the FIG. 1 cache memory store.

The cache storage address signals CS00–09, see FIGS. 1 and 2, are developed from the comparator logic and the effective address. The ten bit address provides access to a 1,024 word cache storage. The ten bit address uses address signals CA and CB from the comparator 29, developed from the comparison bits from the tag directory 28, and bits ZC10–17 from the effective address. The address signals CA and CB are used to address the required level or chips select from one of the four words in the block of words in the cache store 10.

The cache store 10 of the preferred embodiment stores 1,024 data bits DO–DN in each chip section with each word length having 36 bits of information in each half of memory store, 72 bits of information in the combined sections. The cache store 10 has four levels accessed by the CA and CB address signals from the comparator 29. The readout data information signals D0OUT-DNOUT are common to all four levels.

The cache store 10 is addressed by the address signals ZC10–17. The ZC16 and ZC17 signals signify whether the word addressed is in the upper or lower half of the memory block or whether a double word, both halves, is to be accessed at the same time.

The D0-DN data signals are the DATA IN signals, see FIG. 1, entered by the ZM switch 12, and the D0OUT-DNOUT signals are the DATA OUT signals transmitted to the main registers of the processor by the ZD switch 13.

The tag directory section 25 includes logic circuitry to indicate that a block of words in the cache store 10 is full and that the data is valid. The logic circuitry develops full/empty status bit signals. The status bit signals are associated with each tag word. The cache store 10 can be cleared by resetting all status bit signals. The cache store 10 is cleared whenever the central processing unit answers an external interrupt signalling that a new program is to be initiated. The status bit signals are activated when a block loading of data information is enabled.

Each of the 64 columns of the tag directory 28 has a two-bit RRO circuit indicating the level or tag that is to be loaded next. The RRO circuit is included with the full/empty status bit signal storage in the control logic 31. The RRO circuit is advanced when a new block of data information is placed into the cache store 10. The absolute address bits AL00–09 are stored into the tag directory location accessed by the effective address bits ZC10–15 and the RRO circuit is advanced accordingly.

The data information stored in the tag directory 28 is the main memory address of the data stored in the cache store 10. Only ten address bits are shown stored in the tag directory 28, the AL00–09 address bits from the address latch register 26. Thus by addressing the level of the tag directory 28, see FIG. 3, by the effective address ZC10–15 signals, the block word information stored in the cache store 10 is obtained. The address information stored in the addressed level is compared in the comparator 29 to the main memory store address AL00–09 signals being requested by the processor.

The comparator 29 essentially is a plurality of comparing circuits, ten in the present embodiment, which compares the ten address signals from each level of the tag directory 28, the M1, M2, M3 and M4 signals, to the ten address signals AL00–09. If a comparison is made by all the signals in any ten signal comparator circuit No. 1, 2, 3 or 4, the comparator 29 generates a MATCH signal from an OR-gate 29*a* to inhibit interrupt generator 16 from generating the INT signal. The retrieval of data information will be from the cache store 10 rather than from the main memory store.

The cache control or directory section 25 is an extension of the port control functions of the processor. The controls of the cache store operate in synchronism with the port control. The interrupt generator 16 controls the tag directory 28 and the search of the tag directory 28 via the processor control logic 23. The cache store 10 is under the control of the directory command 22 of the processor. The directory command 22 along with the port select matrix 17 generates the instruction or patterns of signals required to control the operation of the processor ports.

The cache address register 30 generates the CS00–10 signals activating the three type of cycles performed by the cache system according to the signals from the processor directory command 22 and the processor control logic 23 and the address signals for the cache store 10. The first cycle is a cache read which is generated when a compare is signaled by the comparator 29 on a data fetch instruction. A data fetch instruction on which no comparison occurs will generate a block load instruction to load new data into the cache store 10. A store operands instructions of the processor on which a comparison occurs will cause a cache store write cycle along with a port store cycle. The usual processor cycles and fault and interrupt cycles do not affect the cache system and cause the processor directory command 22 to operate in a manner as if the cache store did not exist.

Figure 4:
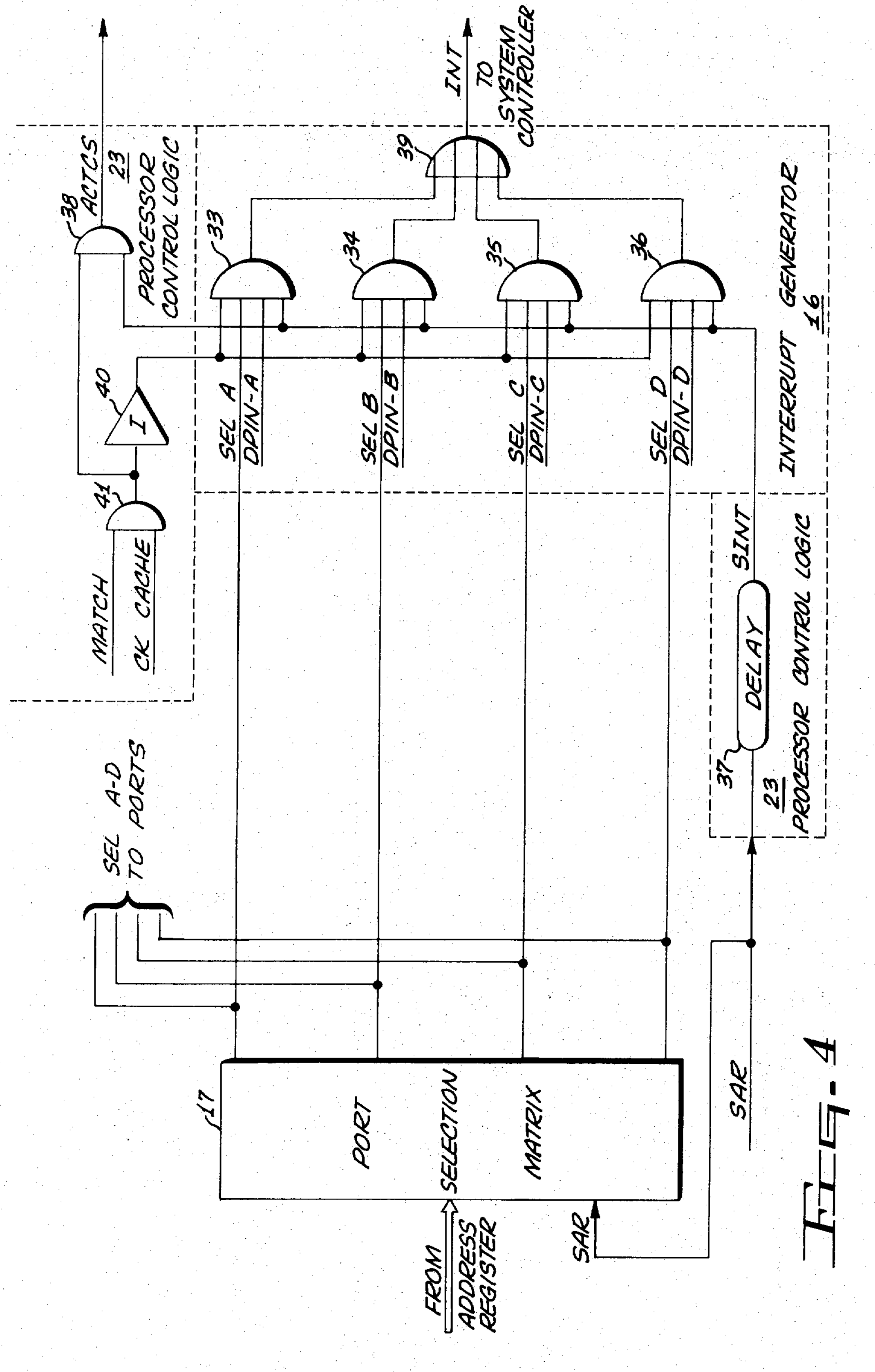
FIG. 4 is a logic diagram of a portion of the communications control apparatus showing the control mechanism for inhibiting the communication connection with the main memory store.

Referring now to FIG. 4 for portions of the detailed logic controlling the communications according to the preferred embodiment of the present invention, the address signals from the address register are directed to the port selection matrix 17 which encodes the address signals to activate one of the ports, four port signals are shown in FIG. 4. The port selection matrix 17 generates one of the select signals SEL A-D for activating a particular port. The select signals are also directed to four AND-gates 33–36 comprising a part of the interrupt generator circuit 16. The port selection matrix 17 generates the select signals under the control of the processor control logic 23 upon the generation of the strobe address register SAR signal.

The processor control logic 23 generates the strobe interrupt signal SINT from the SAR signal via a delay line 37 shown in FIG. 4 signifying a time delay between the two timing signals. The strobe interrupt SINT signal is directed to all four AND-gates 33–36 of the interrupt generator 16 and to another AND-gate 38 which generates the activate cache store signal ACTCS.

A third leg of the AND-gates 33–36 of the interrupt generator 16 is controlled by a port activate signal DPIN A-D depending upon the port which is activated by the select signal. When the selected port is ready to transmit from the processor, the selected port generates a port active signal, the DPIN signal, which then signals to the processor that the port is ready to receive the address signals from the processor to activate the system controller and the main memory store to obtain the required data information. The processor awaits the generation of the interrupt INT signal from an OR-gate 39 having its inputs connected to the four AND-gates 33–36 of the interrupt generator 16. The activation of any one of the AND-gates 33–36 causes the OR-gate 39 to generate the INT signal.

The fourth input leg of the four AND-gates 33–36 o[f] the interrupt generator 16 is controlled by the outpu[t] of an inverter 40 having its input controlled by a[n] AND-gate 41. The signals controlling the AND-gate 41 are the MATCH signal from the comparator 29 and th[e] check cache CK CACHE signal from the processo[r] control logic 23. The CK CACHE signal is activated o[n] processor cycles which require data information fro[m] a memory store. If the cache store of the processor i[s] to be checked and if the data information is found t[o]

be in the cache store, the MATCH signal is generated, the AND-gate 41 is activated and generates a high or enabling signal which is inverted by the inverter 40 to become a low or disabling signal. The inverted signal prevents any of the four AND-gates 33–36 of the interrupt generator 16 from becoming enabled. Inhibiting the enabling of the four AND-gates 33–36 inhibits the generation of the INT signal. Thus if the data information required by the processor is found to be contained in the cache store, the generation of the signal to activate the retrieval of the data information from the main memory store is inhibited.

The output of the AND-gate 41 is also directed to one leg of the AND-gate 38 which generates the activate cache store ACTCS signal. As stated previously, the other leg of the AND-gate 38 is controlled by the strobe interrupt SINT signal. Upon the generation of the SINT signal, the activate cache store ACTCS signal is generated which is directed to the cache address register 30 to allow the cache store address signals CS00–10 to be directed to the cache store 10 to address the cache store 10 and transfer the information via the ZD switch 13 to the processor.

Figure 5:
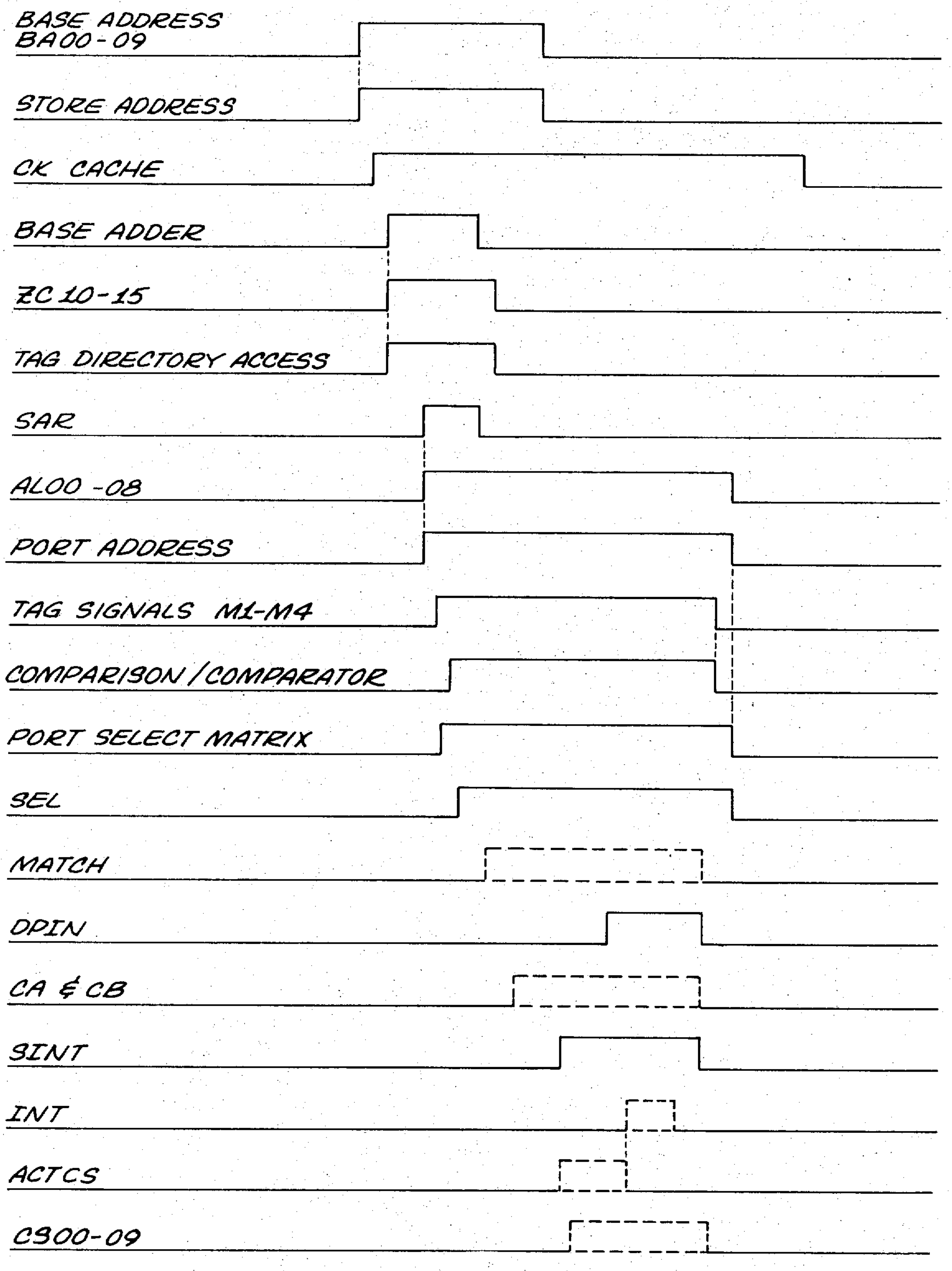
FIG. 5 is a timing diagram showing the relative positions of the different signals of the communications control apparatus of FIG. 1.

An operational cycle will now be described. Referring to the figures and especially FIG. 5, the processor communication cycle starts with the entry of the store and base address signals into the communications control unit. Shortly thereafter the check cache store CK CACHE signal is activated if the processor cache store is to be used on this cycle. All cache cycles start with the generation of a strobe address register SAR signal. At this time the effective address bits ZC10–15 are stable and provide an access to the tag directory 28. The SAR signal loads the cache address latch register 27, the address latch register 26, and the address register 21 via the ZC switch 20. Additionally, the SAR signal will store and hold or latch the effective address bits ZC10–ZC17 and the output bits AA00–09 from the base adder 19 into the address register 21 and the address latch 26. Both addresses are saved in the event a block load cycle is required.

The time between the SAR signal and the strobe interrupt SINT signal is the normal time for the selection of the port to be used for main memory communication. At this time the comparison of the addresses from the tag directory 28 and the address latch register 26 are made in the comparator 29 and the selection of the communication port is made by the port select matrix 17. On operations when a correct comparison is made, the MATCH signal is generated by the comparator 29 thereby inhibiting the generation of the INT signal when the selected port signals a ready signal, DPIN signal, and a strobe interrupt signal SINT is generated by the processor control logic 23. The port cycle is cancelled, and the data from the cache store 10 is used. The ACTCS signal loads the cache address register 30. The control signals of the cache store 10 from the comparator 29 and the effective address bits ZC09–ZC17 are now stored in the cache address register 30.

If a cache read cycle is signalled such as on a transfer operand, the cache address signals CS00–12 are not stored in the cache address register 30 but will start a cache store access immediately. As soon as the internal INT signal is generated, the processor control logic 23 will generate a signal signifying that the data is located in the processor port, for this instance in the cache store 10. The port cycle is then completed in a normal fashion transmitting the data information to the operations unit for processing.

On a block load of data into the port system, data information fetch request with no compare in the tag directory 28, two port cycles are required. The first SINT signal will be released to the main memory store and the processor directory command 22 will be loaded with the block load function requirement and the address signals of the cache store will be placed into the cache address register 30. The SINT signal is not sent to the control. This prevents further address generation to allow the initiation of a second cycle. A flag is set in the port to generate the second cycle. During the second cycle, the tag directory 28 is activated to a write mode and the tag address latched in the cache address latch 27 will be written into the tag directory 28. The column address in the tag directory 28 is selected by the effective address bits ZC10–15 and the level is selected by the RRO counter signals. The RRO counter is then updated. The SINT signal is transmitted from the selected port and the incoming data is written into the cache store 10 according to the address stored in the cache address register 30.

The bit signals stored in the tag directory 28 are the address bits AL00–09 from the address latch register 26. These address bits are also applied to the comparator 29 and to the control logic 31. On cache store load cycles, the address bits AL00–09 are entered into the tag directory 28 and control the full/empty flag and RRO status of the control logic 31. On subsequent cycles which check the tag directory 28 for the address of data information stored in the cache store 10, the address bits AL00–09 are compared in the comparator 29 with the four TAG signals M1–M4 from the tag directory 28. The TAG signals reflect the absolute address of each data block.

The comparator 30 generates a MATCH signal which controls the generation of the INT signal by the interrupt generator 16. The comparator 30 also generates two compare address signal bits CA and CB which are directed and stored in the cache address register 30. The CA and CB bits along with the effective address bits ZC10–17 from the ZC switch 20 make up the cache store address.

Very high speed integrated circuit packages are used for implementation of the cache store 10 as well as the other store units, such as the tag directory 28. The cache store address, see FIG. 2, directs the addressing of the particular circuit package along with the particular word or part of word from each package. The particular addressing of the integrated circuit packages is well known in the art and will not be further explained here. The comparator 29, see FIG. 3, comprises four groups of standard comparing circuits Nos. 1, 2, 3 and 4, with each group of comparing circuits checking a set of ten address latch register signals AL00–09 with the ten address signals, M1 for instance, retrieved from the tag directory 28. The second set of ten address signals M2 are compared in the comparing circuit No. 2. A MATCH signal is generated by the OR-gate **29*a* if all signals of any group are correctly compared. The comparison signals are also directed to a 4 to 2 encoder circuit 29*b* to generate the CA and CB signals directed to the cache address register 30.**

Thus what has been discussed is an embodiment of a communications control system embodying the principles of the present invention. There will be immediately obvious to those skilled in the art many modifications of structure, arrangement, proportions, the elements, materials and components used in the practice of the invention. For instance, a 1K cache store is included in the explanation of the preferred embodiment. It is obvious that by increasing the addressing bit signals by one bit doubles the address capability of the address signals and the usable cache store size to 2K. The size of the cache store 10 should not be taken as a limiting factor. The appended claims are, therefore, intended to cover and embrace any such modifications, within the limits only of the true spirit and scope of the invention.

I claim:

1. A processor communications control apparatus for controlling the retrieval of data information from either an addressable cache store in an electronic data processor or an addressable main memory store according to store address signals identifying the store location of the data information, said apparatus comprising:

command means for generating timing signals in response to the store address signals;

a base adder connected to said command means and to receive said store address signals for adding a base address portion to the store address signals in response to a first timing signal;

checking means for checking the cache store for the data information according to the store address signals;

comparator means connected to said checking means for generating a match signal in response to the determination that the data information is in the cache store;

a port means connected to receive the added address signals from said base adder for providing a communication connection between the processor and the main memory store;

an interrupt generator for generating an interrupt signal to the main memory store to provide communication access between the processor and the main memory store through said port means in response to a second timing signal from said command means and a signal from the port means that a communication connection is available;

said match signal being generated before the occurrence of said second timing signal, said match signal controlling said interrupt generator to inhibit the generation of said interrupt signal.

2. A processor communications control apparatus as described in claim 1 wherein said command means generates a signal activating the addressing of the cache store in response to the match signal to transmit the addressed data information for utilization by the processor.

3. A processor communication control apparatus for controlling the retrieval of data information from either an addressable cache store in an electronic data processor or an addressable main memory store according to store address signals identifying the store location of the data information, said apparatus comprising:

an address register for storing the store address signals of the data information to be retrieved;

a command means connected to said address register for generating command timing signals in response to the store address signals;

a base adder connected to said command means and to said address register for adding a base address portion to the store address signals in response to a first command timing signal;

a plurality of connecting port means for providing a communication connection between the processor and the main memory store;

a port select means connected to receive the added address signals from said base adder for selecting the one of the plurality of port means to be used for communication with the main memory store;

an interrupt generator for generating an interrupt signal to the main memory store to provide communications access between the processor and the main memory store through the selected port means in response to a second timing signal from said command means;

checking means connected to said address register for checking the cache store for the data information according to the store address signals; and comparator means connected to said checking means for generating a match signal in response to the determination that the data information is in the cache store;

said match signal being generated before the occurrence of said second timing signal, said match signal controlling said interrupt generator to inhibit the generation of said interrupt signal and activating the cache store to transmit the addressed data information for utilization by the processor.

4. A process communications control apparatus for controlling the retrieval of data information from either an addressable cache store in an electronic data processor or an addressable main memory store including command means for generating timing signals in response to the store address signals, a base adder connected to said command means and to receive said store address signals for adding a base address portion to the store address signals in response to a first timing signal, a port means connected to receive the added address signals from said base adder for providing a communication connection between the processor and the main memory store, and an interrupt generator for generating an interrupt signal to the main memory store to provide communications access between the processor and the main memory store through said port means in response to a second timing signal from said command means and a signal from the port means that a communication connection is available, wherein the inprovement comprises:

checking means for checking the cache store for the data information according to the store address signals; and comparator means connected to said checking means for generating a match signal in response to the determination that the data information is in the cache store; and means for coupling said checking means and said comparator means to said command means so that said operations are performed by said checking and said comparator means at the same time that the base adder and port means are performing their operations, said match signal being generated before the occurrence of said second timing signal, said match signal controlling said interrupt generator to inhibit the generation of said interrupt signal and controlling said command means to generate a third timing signal to activate the addressing of the cache store to transmit the addressed data information for utilization by the processor.

5. A method of controlling the communication of an electronic data processor having an addressable main memory store and an addressable cache store to obtain data information either from the cache store or from the addressable main memory store comprising the steps of:

a. accepting the absolute address signals generated by the processor identifying the location of the data information in store;
b. manipulating the accepted absolute address signals to construct the actual address location of the data information;
c. actuating a search of the cache store for the data information according to the accepted absolute address signals while manipulating the accepted absolute address signals;
d. using the absolute address signals to select a communication line with the main memory store;
e. actuating the generation of an interrupt signal to accomplish the interconnection with the main memory store after the communication line is selected;
f. inhibiting the generation of the interrupt signal if the search of the cache store locates the required data information;
g. retrieving the data information from the cache store if the search of the cache store locates the required data information otherwise retrieving the data information from the main memory store; and
h. supplying the retrieved data information to the processor.

6. A method of controlling the communications of an electronic data processor having an addressable main memory store and an addressable cache store including a tag directory to obtain data information either from the cache store or from the addressable main memory store comprising the steps of:

a. accepting the absolute address signals generated by the processor identifying the location of the data information in store;
b. retrieving tag address information to the cache store from the tag directory according to the accepted absolute address signals;
c. manipulating the accepted absolute address signals to construct the actual address location of the data information;
d. comparing the retrieved tag address information to the accepted absolute address signals to see if the required data information is in the cache store while manipulating the accepted address signals;
e. using the absolute address signals to select a communication line with the main memory store;
f. actuating the generation of an interrupt signal to accomplish the interconnection with the main memory store after the communication line is selected;
g. inhibiting the generation of the interrupt signal if the comparison is accomplished;
h. retrieving the data information from the cache store if the comparison is accomplished otherwise retrieving the data information from the main memory store; and
i. supplying the retrieved data information to the processor.

7. A method according to claim 6 further including the step of generating a portion of the cache address signals from the step of comparing, the generated cache address signal portion being used with a portion of the accepted address signals to accomplish the retrieval of data information from the cache store.

* * * * *